(12) United States Patent
Higeta

(10) Patent No.: US 12,731,357 B2
(45) Date of Patent: Sep. 8, 2026

(54) INFORMATION PROCESSING APPARATUS THAT MOVES VIRTUAL OBJECT IN VIRTUAL REALITY SPACE, METHOD FOR CONTROLLING INFORMATION PROCESSING APPARATUS, INFORMATION PROCESSING SYSTEM, AND STORAGE MEDIUM

(71) Applicant: CANON KABUSHIKI KAISHA, Tokyo (JP)

(72) Inventor: Tatsuya Higeta, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/048,347

(22) Filed: Feb. 7, 2025

(65) Prior Publication Data

US 2025/0265797 A1 Aug. 21, 2025

(30) Foreign Application Priority Data

Feb. 15, 2024 (JP) ................................ 2024-021148

(51) Int. Cl.
*G06T 19/20* (2011.01)
*G06F 3/01* (2006.01)
(Continued)

(52) U.S. Cl.
CPC .............. *G06T 19/20* (2013.01); *G06F 3/014* (2013.01); *G06F 3/0346* (2013.01); *G06T 19/006* (2013.01); *G06T 2219/2004* (2013.01)

(58) Field of Classification Search
None
See application file for complete search history.

(56) References Cited

U.S. PATENT DOCUMENTS 6,389,375 B1 * 5/2002 Thomsen ................ G06T 17/10 703/2
2003/0043174 A1 * 3/2003 Hinckley ............ G06F 3/04883 345/684

(Continued)

FOREIGN PATENT DOCUMENTS

JP 2020-129167 A 8/2020
JP 2022-551069 A 12/2022
JP 7391950 B2 12/2023

OTHER PUBLICATIONS

Using Snap To Grid tool to evenly spaced and align parts (snapping tool), Dec. 19, 2023, PrizeCP Roblox, https://www.youtube.com/watch?v=aiUSsqXaZsM. (Year: 2023).*

(Continued)

*Primary Examiner* — Kirk W Hermann
(74) *Attorney, Agent, or Firm* — VENABLE LLP

(57) ABSTRACT

An information processing apparatus adjusting a position of a virtual object at a destination thereof when the virtual object is moved in a mixed reality space. In the information processing apparatus, a moving operation of moving the virtual object in a virtual reality space or the mixed reality space is acquired, the moving operation is switched between a first moving operation that enables a continuous movement of the virtual object and a second moving operation that enables a stepwise movement of the virtual object, and directions in which the virtual object is movable in the second moving operation are restricted to at least one direction.

20 Claims, 15 Drawing Sheets

(51) Int. Cl.

| | |
|---|---|
| ***G06F 3/0346*** | (2013.01) |
| ***G06T 19/00*** | (2011.01) |

(56) References Cited

U.S. PATENT DOCUMENTS

| | | | | |
|---|---|---|---|---|
| 2014/0306993 | A1* | 10/2014 | Poulos | G06T 19/006 345/633 |
| 2018/0122043 | A1* | 5/2018 | Energin | G06T 19/006 |
| 2021/0383594 | A1* | 12/2021 | Tang | G06F 1/163 |
| 2022/0137705 | A1* | 5/2022 | Hashimoto | G06F 1/1694 345/156 |
| 2024/0331278 | A1* | 10/2024 | Arora | G06F 3/012 |

OTHER PUBLICATIONS

Concept of GIZMOS in AutoCAD, Apr. 26, 2021, SabeerCAD, https://www.youtube.com/watch?v=AAETjUVxBP8. (Year: 2021).*

Blender 3D Unit Scale & Grid Snapping: Learn Precision Modelling, Dec. 1, 2023, MJ3D Blender, https://www.youtube.com/watch?v=6HgooYZ5obk. (Year: 2023).*

Ryan King Art, Exclude an Axis When Transforming Objects (Blender Tip), Jun. 16, 2023, https://www.youtube.com/watch?v=KcnVXwqeoul (Year: 2023).*

* cited by examiner 160
110
OTP
111
ORIENTATION DETECTION PART
109
COMMUNICATION PART
150
108
COMMUNICATION PART
107
CONTROL PART
102
RAY CONTROL PART
104
CG CONTROL PART
101
IMAGE STORAGE PART
105
DRAWING PART
106
CAMERA
103
DISPLAY

| CG LIST | POSITION (x, y, z) | SHAPE POINT GROUPS |
|---|---|---|
| CG1 | (x1, y1, z1) | (x11, y11, z11)、(x12, y12, z12)、・・・・ |
| CG2 | (x2, y2, z2) | (x21, y21, z21)、(x22, y22, z22)、・・・・ |
| CG3 | (x3, y3, z3) | (x31, y31, z31)、(x32, y32, z32)、・・・・ |
| CG4 | (x4, y4, z4) | (x41, y41, z41)、(x42,y42, z42)、・・・・ |

*FIG. 4B*

| START POSITION OF RAY (x, y, z) | END POSITION OF RAY (x, y, z) |
|---|---|
| (xLS, yLS, zLS) | (xLE, yLE, zLE) |

INFORMATION PROCESSING APPARATUS THAT MOVES VIRTUAL OBJECT IN VIRTUAL REALITY SPACE, METHOD FOR CONTROLLING INFORMATION PROCESSING APPARATUS, INFORMATION PROCESSING SYSTEM, AND STORAGE MEDIUM

BACKGROUND OF THE INVENTION

Field of the Invention

The present invention relates to an information processing apparatus, a method for controlling the information processing apparatus, an information processing system, and a storage medium.

Description of the Related Art

Some recently known apparatuses are configured to overlay information, such as an image of a virtual space, on an image of a reality space in real time, thereby allowing a user to experience mixed reality (MR). Such an apparatus can display a composite image in which an image of a virtual space, such as a computer-generated image (CGI), is superimposed on the whole or a portion of an image of a reality space which has been picked up by a video camera or other image pickup apparatus. This apparatus permits a user to operate the CGI so as to move to any given position. As an example, HoloLens 2 produced by Microsoft (Registered trademark) Corporation, in response to a user's manual operation on a target CGI, can display a linear image called a "ray" between his/her hand and the CGI in order to clarify the CGI. With this, the user can easily operate the target CGI. As another example, Japanese Laid-Open Patent Publication (kokai) No. 2020-129167 discloses a technique in which, when a target CGI (virtual object) is moved from a departure point to a destination in a mixed space where a reality space and a virtual space are combined, the moving direction is displayed as an operation axis in the mixed space. The technique described in Japanese Laid-Open Patent Publication (kokai) No. 2020-129167 permits the movement of the CGI along the operation axis.

With the technique described in Japanese Laid-Open Patent Publication (kokai) No. 2020-129167, the CGI can be moved along the operation axis in the mixed space. However, there are cases where the position of the CGI at the destination, namely, the arrangement position thereof cannot be easily and finely adjusted. Furthermore, when the target CGI is moved using the ray displayed between the user's hand and the CGI, if the movement of the user's hand becomes unstable due to the shaking of the hand, for example, it may be difficult to finely adjust the position of the CGI at the destination.

SUMMARY OF THE INVENTION

The present invention provides an information processing apparatus that, when a virtual object is moved in a virtual reality (VR) space or an MR space, can accurately and easily adjust the position of the virtual object at a destination thereof, a method for controlling the information processing apparatus, an information processing system, and a storage medium.

Accordingly, the present invention provides an information processing apparatus comprising a processor, and a memory storing a program which, when executed by the processor, causes the information processing apparatus to perform an acquiring process to acquire a moving operation of moving a virtual object in a virtual reality space or a mixed reality space, perform a switching process of switching the moving operation between a first moving operation that enables a continuous movement of the virtual object and a second moving operation that enables a stepwise movement of the virtual object, and perform a direction restricting process of restricting directions in which the virtual object is movable in the second moving operation to at least one direction.

According to the present invention, when a virtual object is moved in an MR space, it is possible to accurately and easily adjust the position of the virtual object at a destination thereof.

Further features of the present invention will become apparent from the following description of exemplary embodiments (with reference to the attached drawings).

BRIEF DESCRIPTION OF THE DRAWINGS

FIGS. 2A to 2D are views each showing a state where the HMD is worn on a user's head and the compact operation device is worn on a user's finger.

FIGS. 4A and 4B are charts each showing a data list for determining the movable range of the virtual object.

FIGS. 9A and 9B are diagrams each showing an example of an image displayed on the display of the HMD.

DESCRIPTION OF THE EMBODIMENTS

Some embodiments of the present invention will be described below in detail with reference to the drawings. However, the configurations described in the following embodiments are merely examples. Thus, the scope of the present invention is not limited by the configurations described in the embodiments. For example, each of the components constituting the present invention can be replaced with any component that may exhibit a similar function. In addition, any other component may be added. Of configurations (features) in the individual embodiments, two or more may be combined together.

Figure 1A:
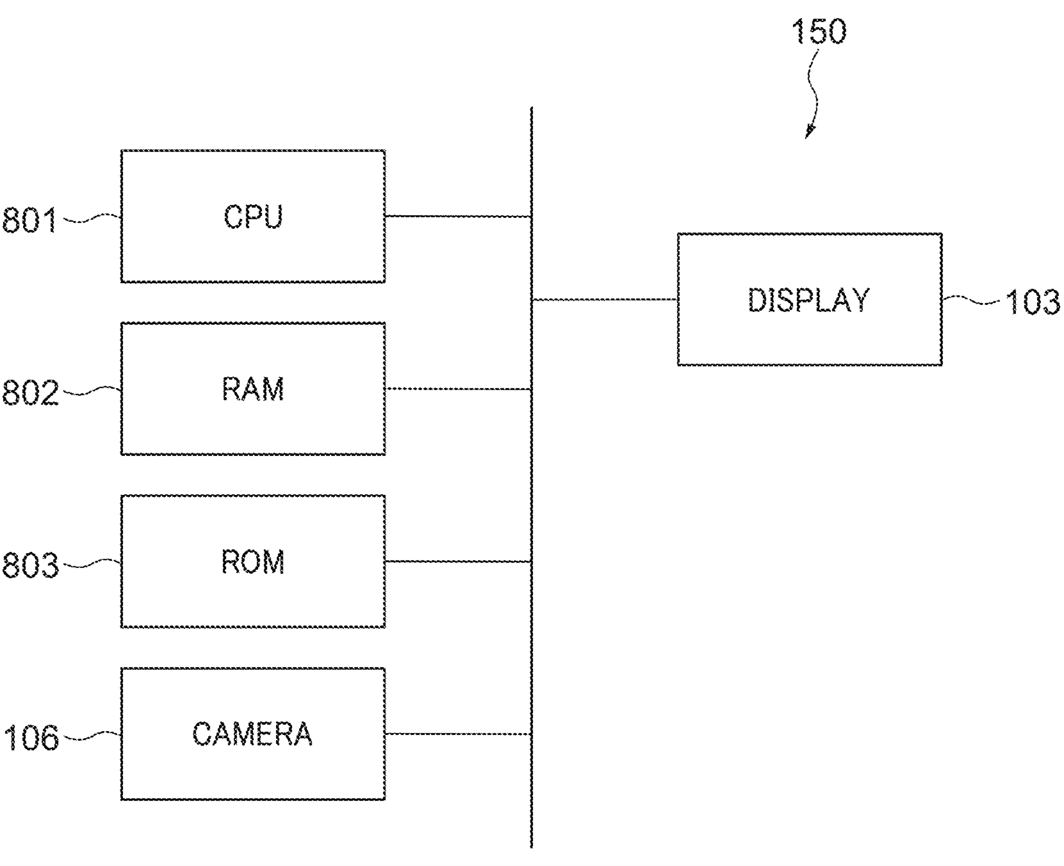
FIG. 1A is a block diagram showing an example of a hardware configuration of a head mounted display (HMD) that employs an information processing apparatus according to a first embodiment of the present invention.

With reference to FIGS. 1A to 8, a first embodiment of the present invention will be described below. FIG. 1A is a block diagram showing an example of a hardware configuration of a head mounted display (HMD), a portion of which employs an information processing apparatus according to the first embodiment. In the present embodiment, an HMD 150 shown in FIG. 1A is an apparatus intended to be worn on a head of a user who uses the HMD 150. It should be noted that an apparatus that can employ the information processing apparatus is not limited to the HMD 150; other examples thereof may include desktop and notebook personal computers, tablet terminals, and smartphones. As shown in FIG. 1A, the HMD 150 includes a central processing unit (CPU) 801, random access memory (RAM) 802, read only memory (ROM) 803, a display 103, and a camera 106. Together with both the ROM 803 and the RAM 802, the CPU 801 constitutes a control part 107 (see FIG. 1B) that controls the entire operation of the HMD 150. The ROM 803 is a storage medium that stores various programs and operational conditions of individual operations, for example. These programs include programs for causing the CPU 801 (computer) perform processes of each part of the HMD 150 (methods for controlling the information processing apparatus). The RAM 802 is also used as a work memory that stores temporary data involved in processes to be performed by the CPU 801.

The display 103, which is formed of a liquid crystal, for example, is a display unit that displays an MR (Mixed Reality) space in which an image of a reality space is combined with an image of a virtual space. The user can see the MR space displayed on the display 103 in a state where the HMD 150 is worn on the user's head (referred to below as "worn state"). The camera 106 is an image pickup unit that can pick up an image of a three-dimensional space, namely, a reality space in front of the camera 106 when the HMD 150 is in the worn state. The camera 106 includes two camera parts corresponding to the user's right and left eyes disposed near the housing of the HMD 150. With this configuration, the camera 106 can pick up an image of the reality space in stereo vision. Alternatively, the display 103 may be a display unit that displays a VR (virtual reality) space.

Figure 1B:
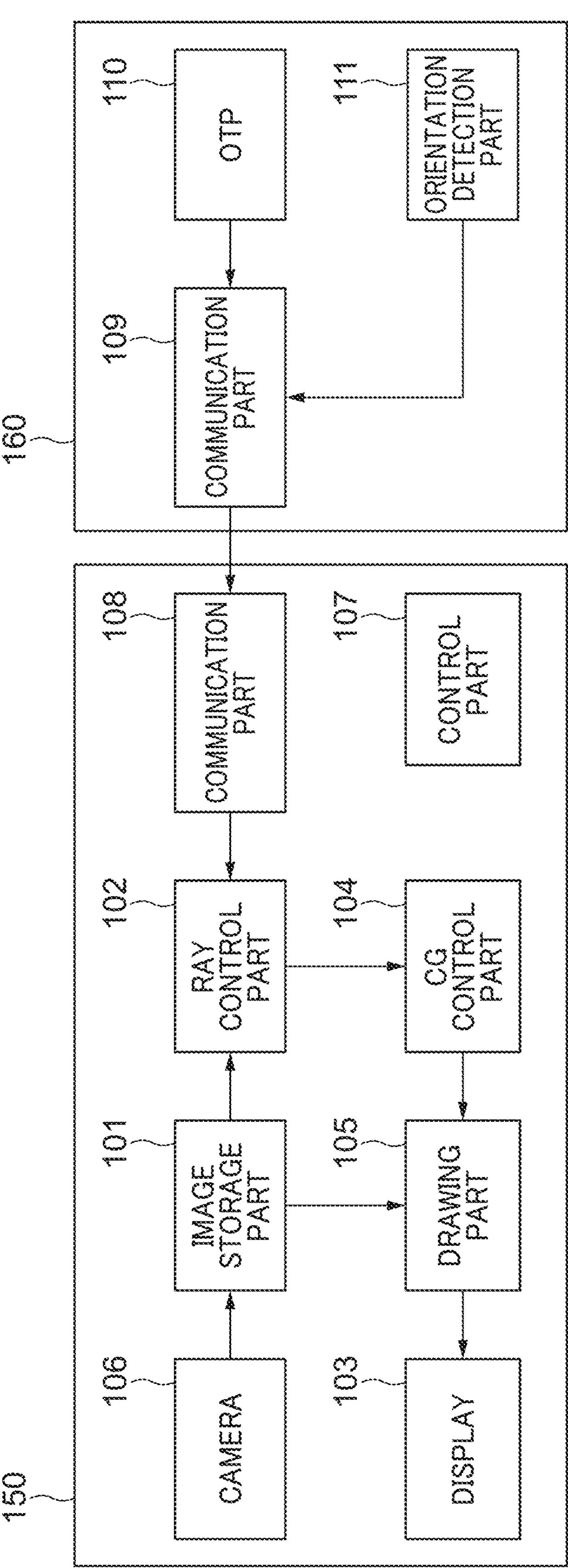
FIG. 1B is a block diagram showing an example of functional configurations of the HMD and a compact operation device.

FIG. 1B is a block diagram showing an example of functional configurations of the HMD and a compact operation device. As shown in FIG. 1B, the HMD 150 includes an image storage part 101, a ray control part 102, the display 103, a computer graphics (CG) control part 104, a drawing part (generation part) 105, the camera 106, the control part 107, and a communication part 108. The image storage part 101 stores an image shot by the camera 106, namely, an image of the reality space. The ray control part 102 controls a position, attitude, and other factors of the ray. The "ray" refers to a linear image displayed between the hand and the virtual object when the user uses his/her hand to perform a moving operation on a virtual object (CG model or a virtual object) that will be described later. This ray can help to clarify a virtual object that is a target to be moved. Further, the ray control part 102 detects a position and attitude of the user's hand, based on the shot image stored in the image storage part 101. The ray control part 102 then can determine (calculate) a start position and an end position of the ray, based on the detected position and attitude of the hand.

The CG control part 104 manages information regarding virtual objects contained in the image of the virtual space. In this case, the virtual objects are displayed on the display 103 with computer graphics (CG). The CG control part 104 determines positions of the virtual objects in the mixed space and controls the selection of the virtual objects and the movement of the selected virtual object. The drawing part 105 generates an MR space by combining an image of the reality space and an image of a virtual space containing virtual objects (generation step). This MR space is displayed on the display 103. Furthermore, the drawing part 105 can draw the virtual objects, for example, on the shot image stored in the image storage part 101 at positions determined by the CG control part 104 and further draw and combine the ray determined by the ray control part 102. The communication part 108 includes: for example, an antenna for wireless communication; and a modulation/demodulation circuit and a communication controller for processing a wireless signal and can communicate with a compact operation device 160. The communication part 108 outputs a modulated radio signal via the antenna and demodulates a wireless signal that has been received via the antenna, thereby conducting short-range wireless communication conforming to the IEEE802.15 standard (so-called Bluetooth (Registered trademark)). In the present embodiment, the Bluetooth communication employs Bluetooth Low Energy version 5.1 that involves low power consumption.

The HMD 150 configured above is communicably connected to the compact operation device 160. The compact operation device 160 is a controller to be removably worn on a finger of the user who uses the HMD 150 and functions as an operation unit used to perform a moving operation of moving virtual objects in the MR space (operation step). The control part 107 of the HMD 150 can switch the moving operation performed by the compact operation device 160 between a first moving operation and a second moving operation (switching step). The "first moving operation" is defined as an operation that enables a continuous movement of a virtual object. The "second moving operation" is defined as an operation that enables a stepwise (discrete) movement of a virtual object. In the present embodiment, as described above, the control part 107 functions as a switching unit that switches the moving operation performed by the compact operation device 160 between the first moving operation and the second moving operation. It should be noted that a portion of the HMD 150 which functions as the switching unit may be provided separately from the control part 107. Furthermore, an instruction (switching operation) of causing the control part 107 to switch between the first moving operation and the second moving operation is provided by the compact operation device 160. It should be noted that the configuration of the compact operation device 160 is not limited to that intended to be removably worn on a user's finger and only has to be graspable by at least a user's hand.

As shown in FIG. 1B, the compact operation device 160 includes a communication part 109, an optical tracking pad (OTP) 110, and an orientation detection part 111. The communication part 109 has a configuration similar to that of the communication part 108. The communication part 109 transmits, to the HMD 150, positional information regarding a position of a user's fingertip which has been detected by the OTP 110 and orientation information regarding an orientation of the compact operation device 160 which has been detected by the orientation detection part 111. The user can use his/her fingertip to perform a sliding operation (touch operation) on the OTP 110. The OTP 110 can receive this sliding operation and detect the positional information on the user's fingertip. The orientation detection part 111 is an inertial measurement unit (IMU) that detects translational motions in three orthogonal axial directions and a rotational motion around each axis. The orientation detection part 111 includes an acceleration sensor that detects the translational motions and an angular velocity sensor (gyro sensor) that detects the rotational motion. With these sensors, the orientation detection part 111 can detect orientation information regarding the orientation of the compact operation device 160.

Figures 2A, 2B:
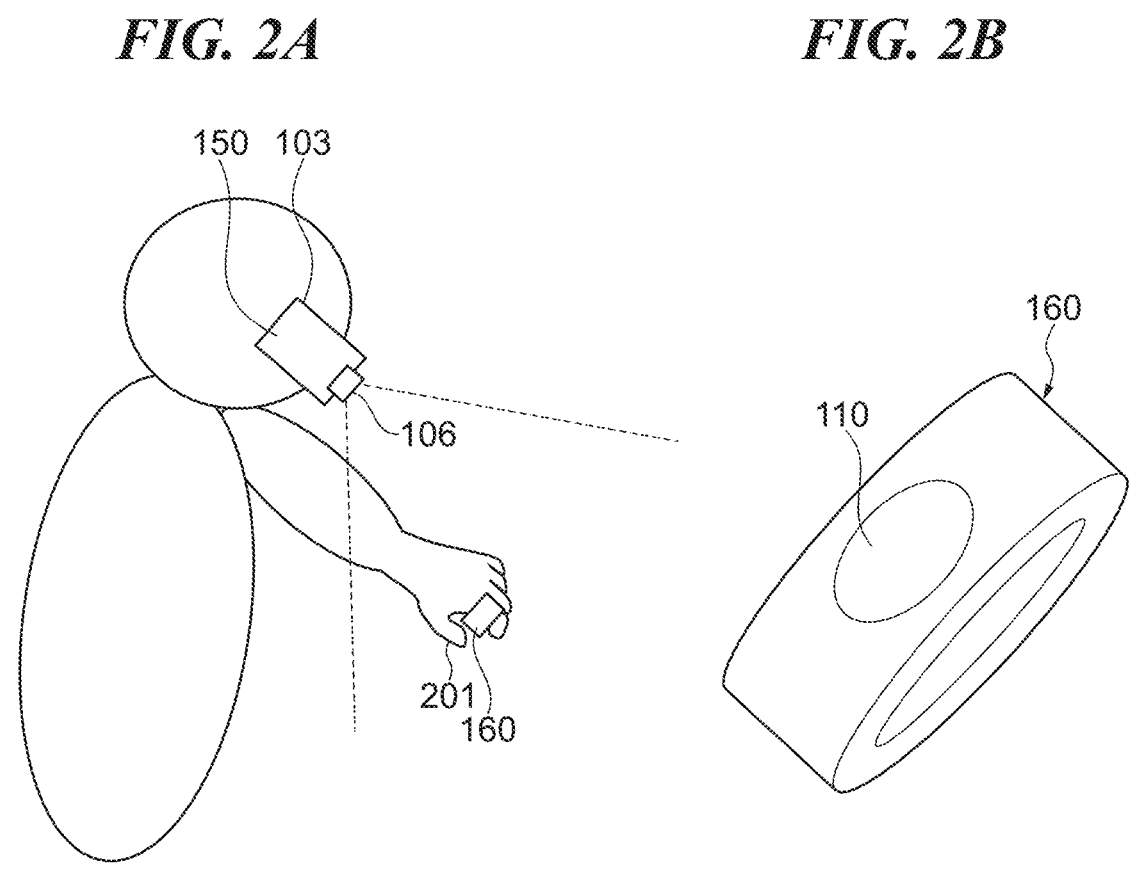
Figure 2C:
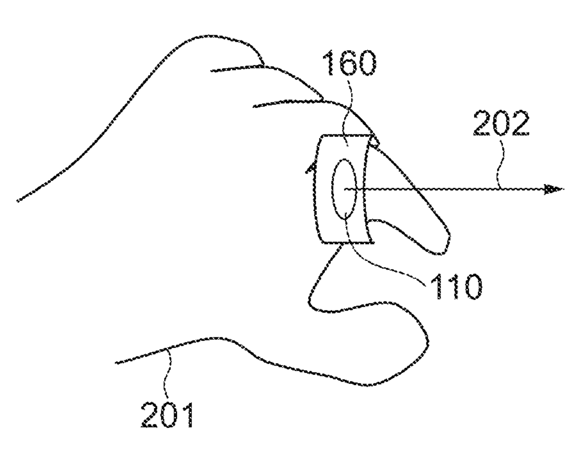
Figure 2C:
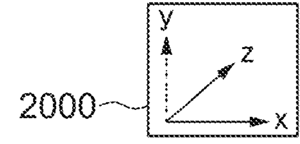
Figure 2D:
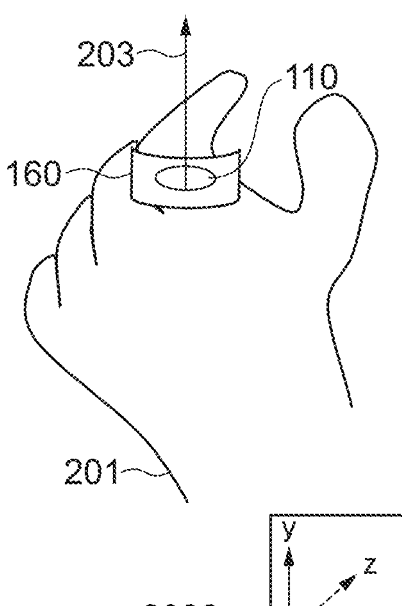

FIGS. 2A to 2D are views each showing a state where the HMD is worn on a user's head and the compact operation device is worn on a user's finger. As shown in FIG. 2A, when the HMD 150 is in the worn state, the camera 106 can shoot an image of a reality space containing a user's hand 201. The compact operation device 160 is worn on the index finger of the hand 201. FIG. 2B is an enlarged perspective view of the compact operation device in FIG. 2A. As shown in FIG. 2B, the compact operation device 160 has a ring shape intended to be removably worn on a finger and has a circumference on which the OTP 110 is disposed. The user can use the tip of his/her thumb to perform the sliding operation on the OTP 110, for example, in a state where the compact operation device 160 is worn on the index finger. In the present embodiment, the CG control part 104 can acquire the positional information on the fingertip on the OTP 110 over time via both the communication part 108 and the communication part 109. The CG control part 104 then can determine what gesture the user is making, namely, when instruction he/she is giving, based on a temporal change in the positional information. In this way, the user can operate virtual objects in the MR space. FIG. 2C is a view showing a state where the compact operation device 160 worn on the user's finger is oriented in the direction of an arrow 202, namely, in a horizontal direction. FIG. 2D is a view showing a state where the compact operation device 160 worn on the user's finger is oriented in the direction of an arrow 203, namely, in a vertical direction. The orientation detection part 111 can detect whether the compact operation device 160 is in the state of FIG. 2C or in the state of FIG. 2D, for example.

Figure 3:
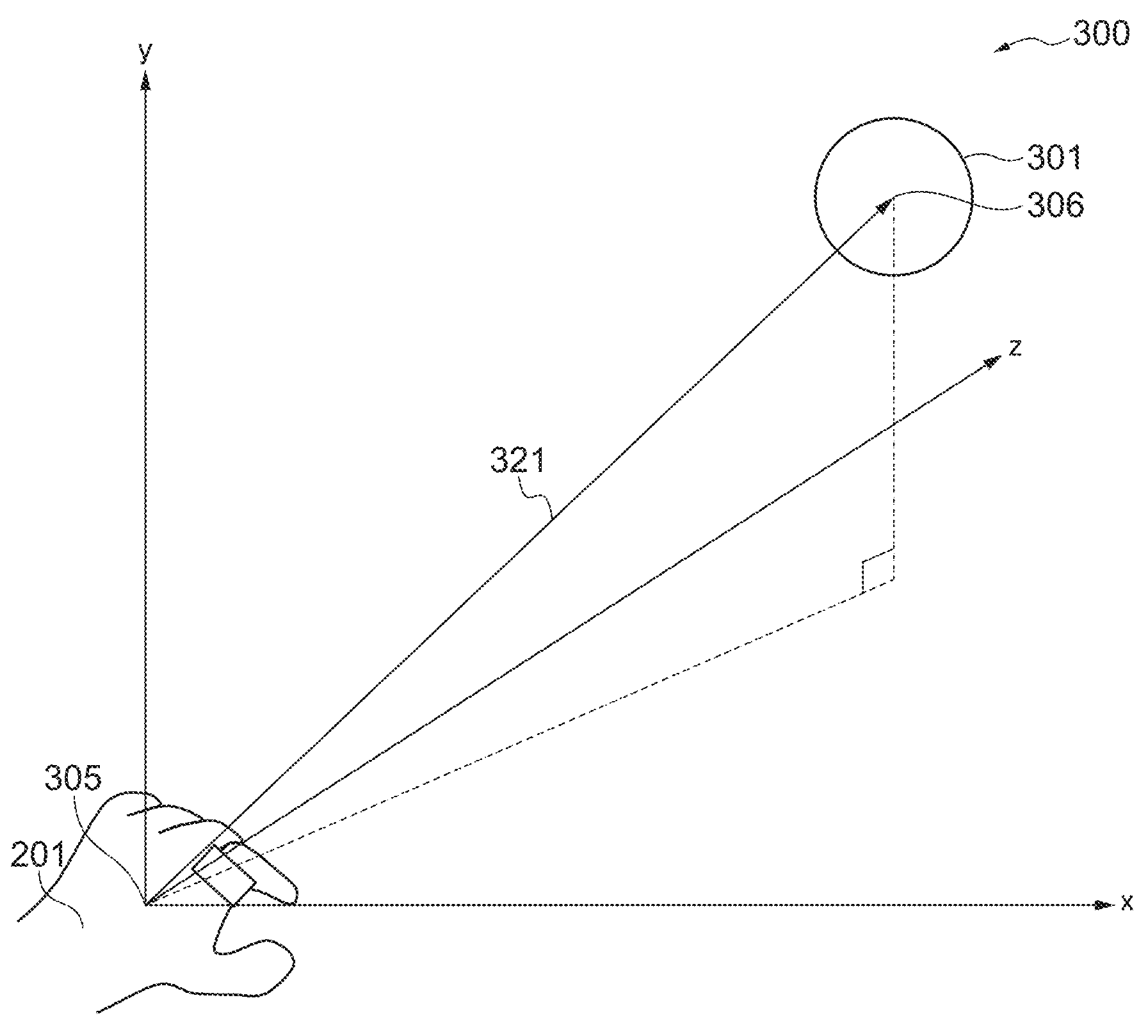
FIG. 3 is a view showing the relationship between a user's hand, a virtual object, and a ray.

FIG. 3 is a view showing the relationship between a user's hand, a virtual object, and a ray. An image 300 shown in FIG. 3 can be an example of an image displayed on the display 103 of the HMD 150. The image 300 contains a user's hand 201 and a virtual object 301. The HMD 150 sets the third joint of the index finger of the user's hand 201 to an origin O305 and defines a right-left direction (horizontal direction) as an x-axial direction, an up-down direction (vertical direction) as a y-axial direction, and a front-back direction (depth direction) as a z-axial direction. A ray 321 is represented by a straight arrow, a start point of which is set to an origin O305 and an end point of which is set to a central point O306 of the virtual object 301. Thus, by detecting the coordinates of the origin O305 and the coordinates of the central point O306, the ray 321 can be displayed. In the present embodiment, for example, the virtual object 301 is a sphere centered on the central point O306. Accordingly, by detecting coordinates of a plurality of points located equidistant from the central point O306, the shape of the virtual object 301 can be represented. Alternatively, to represent the shape of the virtual object 301, for example, a point group having a plurality of arbitrary feature points may be used. Furthermore, by regarding the position of the compact operation device 160 as the origin 305, the ray can be displayed so as to extend from the compact operation device 160. The direction of the ray depends on the orientation or attitude of the compact operation device 160. In the present embodiment, the third joint of the index finger of the hand 201 is set to the origin 305; however, a method of determining the origin 305 is not limited. Alternatively, for example, the central position of the hand 201 may be set to the origin 305.

FIGS. 4A and 4B are charts each showing a data list for determining the movable range of the virtual object. FIG. 4A shows virtual objects formed with CG, central positions of these virtual objects, and point groups (shape point groups) representing shapes of the individual virtual objects. Such information is managed, for example, by an application stored in the ROM 803 of the HMD 150. As shown in FIG. 4A, for example, virtual object 1 (CG1) is represented by a central position (x1, y1, z1) and a shape point group containing positions of points (x11, y11, z11), (x12, y12, z12), and so on. With this data, the position and shape of CG1 can be determined (identified). If the moving operation is performed on virtual object 1, the coordinates of the center thereof and the coordinates of each point contained in the shape point group thereof are updated. It should be noted that the number of points contained in the shape point group depends on the shape of the virtual object. A method for determining a shape of a virtual object is not limited to that using coordinates; alternatively, any other method using at least information that contributes to determination of a shape of a virtual object may be employed. FIG. 4B shows a relationship between a start position (start point) and end position (end point) of the ray. The start position (xLS, yLS, zLS) of the ray indicates, for example, the positional coordinates of the third joint of the index finger of the user's hand 201 in the reality space. The end position (xLE, yLE, zLE) of the ray can be instructed through a predetermined user's operation, for example. The predetermined user's operation is not particularly limited, and examples thereof include a gesture and a user's sliding operation of sliding his/her fingertip over the OTP 110 of the compact operation device 160. Other examples of the predetermined user's operation includes, except an operation on the compact operation device 160, operations on an apparatus with a touch pad, an apparatus with a mechanical button, or a joystick. If the user moves his/her hand, the start position (xLS, yLS, zLS) and the end position (xLE, yLE, zLE) of the ray are updated. It should be noted that at which coordinate each coordinate shown in FIG. 4A is located in the reality space can be calculated by adding the start position of the ray shown in FIG. 4B.

Figure 5:
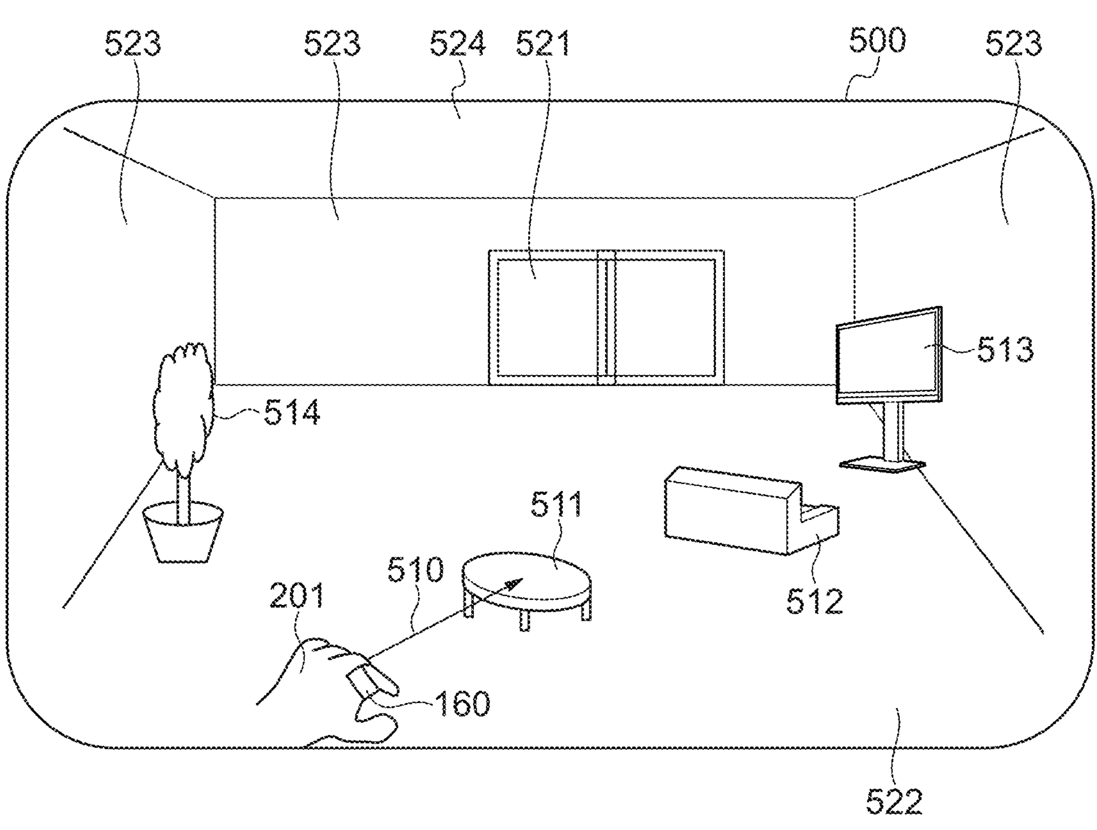
FIG. 5 is a view showing an example of an image displayed on a display of the HMD.

FIG. 5 is a view showing an example of an image displayed on a display of the HMD. An image 500 shown in FIG. 5 is an image of an MR space. The image 500 contains a virtual object 511, a virtual object 512, a virtual object 513, and a virtual object 514. The virtual object 511 is a table, which corresponds to virtual object 1 in FIG. 4A. The virtual object 512 is a sofa, which corresponds to virtual object 2 in FIG. 4A. The virtual object 513 is a television, which corresponds to virtual object 3 in FIG. 4A. The virtual object 514 is a foliage plant, which corresponds to virtual object 4 in FIG. 4A. Furthermore, the image 500 contains a ray 510, the user's hand 201 shot by the camera 106, and the compact operation device 160 that is shot by the camera 106 and worn near the third joint of the index finger of the hand 201. In FIG. 5, the ray 510 starts from the third joint of the index finger of the hand 201, namely, from the compact operation device 160 and ends at the center of the virtual object 511. When the user moves the hand 201 together with the compact operation device 160 in this state, the ray 510 follows the movement of the hand 201, so that it is possible to perform a moving operation of moving the virtual object 511 to a desired position. It should be noted that, to move the virtual object 511 to a desired position, for example, the user can also perform a sliding operation of sliding his/her thumb over the OTP 110 of the compact operation device 160 in the direction toward the desired position. In the present embodiment, as described above, the compact operation device 16 functions as an operation unit that performs a moving operation of moving the virtual object in the MR space. Moreover, the image 500 contains a window 521, a floor 522, walls 523, and a ceiling 524. These components are images of the reality space shot by the camera 106.

Figure 6A:
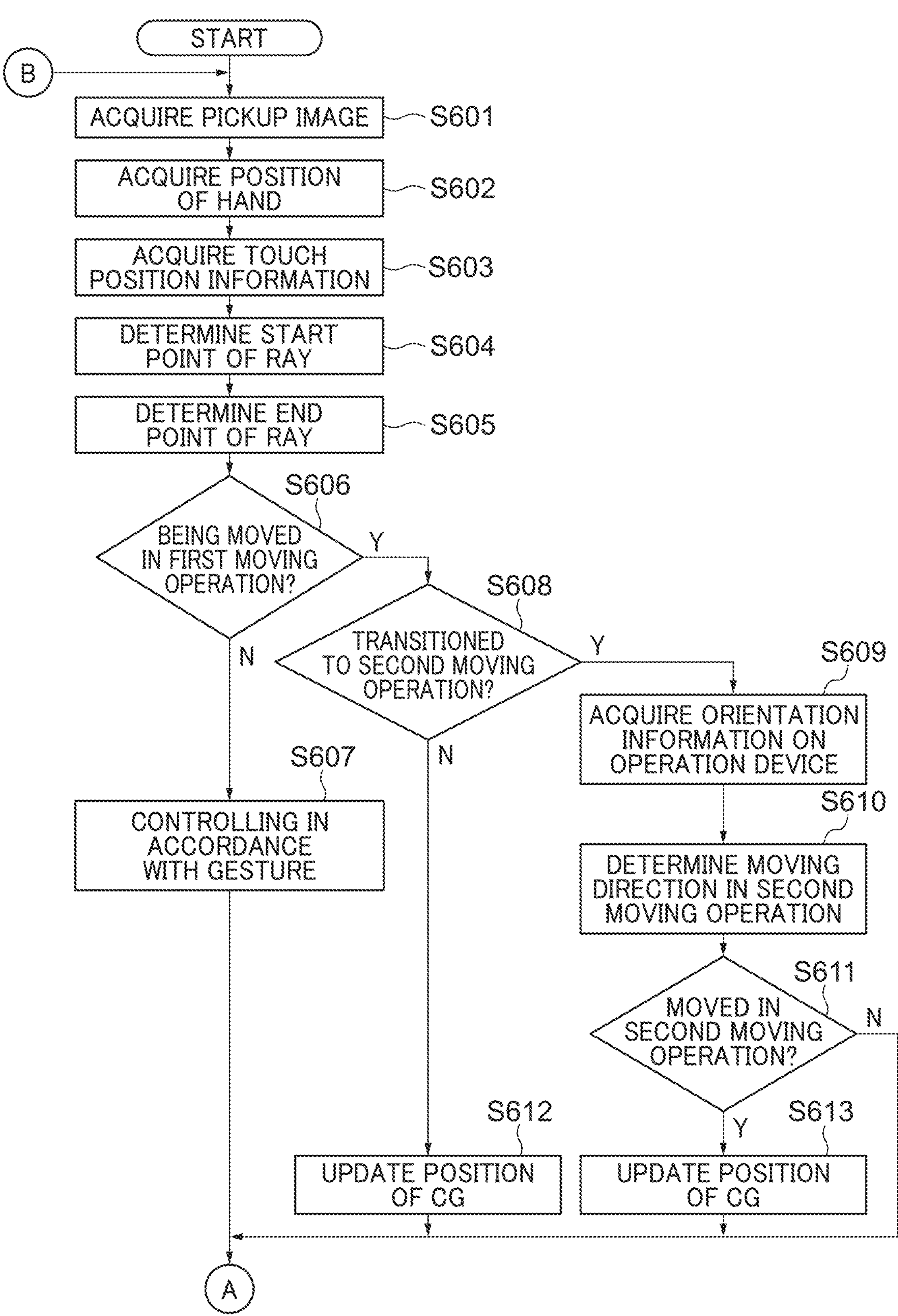
FIGS. 6A and 6B are flowcharts each showing a process to be performed in the HMD.
Figure 6B:
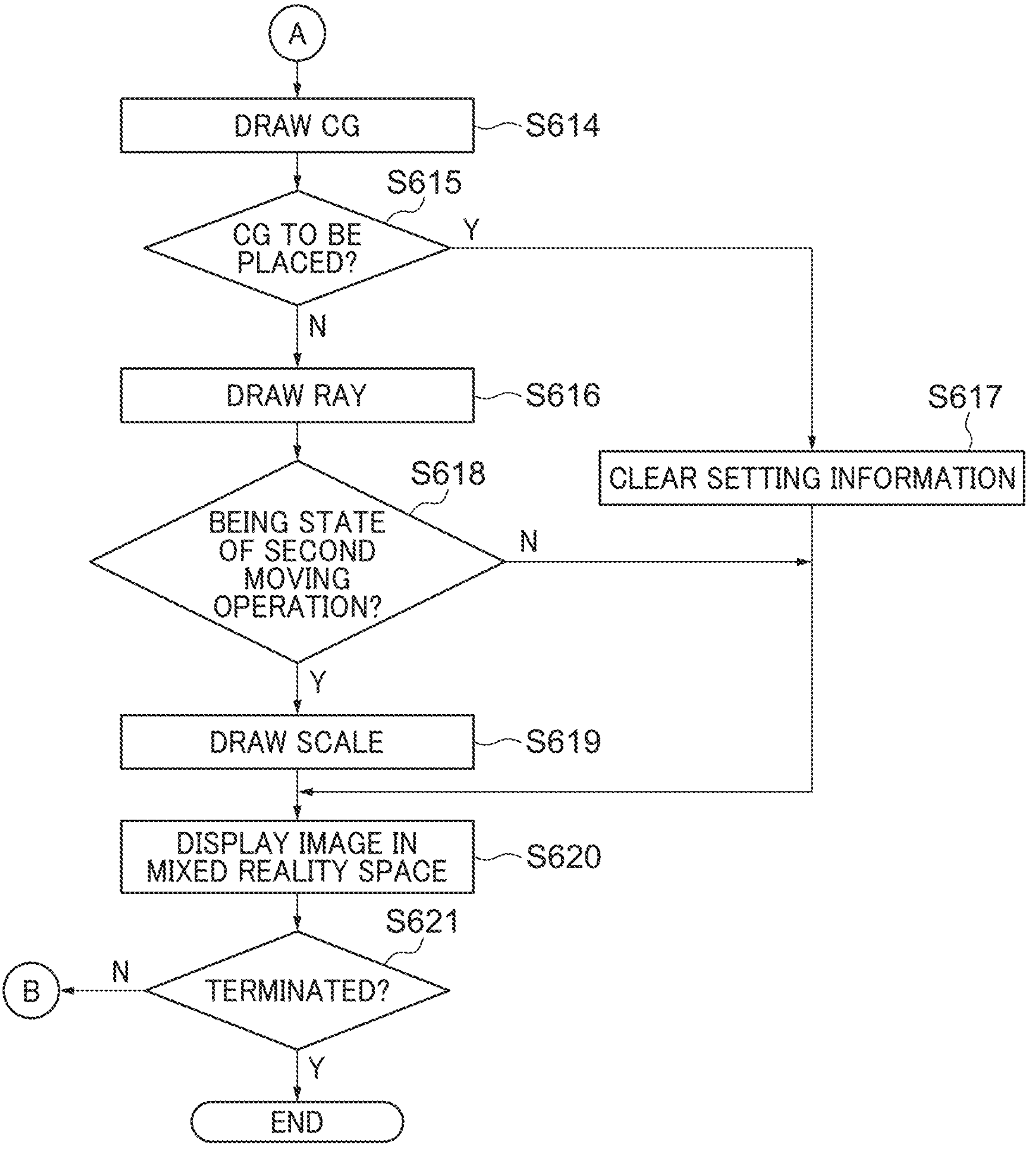

FIGS. 6A and 6B are flowcharts each showing a process to be performed in the HMD. The program based on the flowcharts shown in FIGS. 6A and 6B is started in a state where the HMD 150 and the compact operation device 160 have been activated. As shown in FIG. 6A, in step S601, the control part 107 of the HMD 150 controls the camera 106 in such a way the camera 106 acquires a pickup image (stereo camera image), namely, an image of a reality space that contains a user's hand. The process then proceeds to step S602. In this case, the pickup image is stored in the image storage part 101.

In step S602, the control part 107 controls the ray control part 102 in such a way that the ray control part 102 detects (extracts) the user's hand contained in the pickup image that has been stored in step S601. The process then proceeds to step S603. It should be noted that a method for detecting a user's hand is not particularly limited; for example, a method using image recognition can be used. In addition, a method for acquiring a distance from the HMD 150 to a user's hand in a reality space is not particularly limited; for example, a stereo image method can be used. The control part 107 then acquires a position of the third joint of the index finger which is indicated by the positional information on the user's hand in the pickup image, based on both the detection result of the user's hand and the distance from the HMD 150 to the user's hand in the reality space. Alternatively, the control part 107 may acquire the positional information on the user's hand with a distance sensor, for example.

In step S603, the control part 107 controls the communication part 108 in such a way that the communication part 108 receives, from the compact operation device 160, the positional information regarding a position at which the user has touched the OTP 110 of the compact operation device 160. The process then proceeds to step S604. In this case, the positional information received in step S603 is sequentially retained in the RAM 802.

In step S604, the control part 107 controls the ray control part 102 in such a way that the ray control part 102 calculates a position of a start point of the ray. The process then proceeds to step S605. In the present embodiment, the position of the third joint of the index finger which has been acquired in step S602 is set to the position of the start point of the ray.

In step S605, the control part 107 controls the ray control part 102 in such a way that the ray control part 102 determines a position (absolute position) of an end point of the ray. The process then proceeds to step S606. A method for determining a position of an end point of a ray is not particularly limited. For example, the ray control part 102 first identifies, as a direction of the ray, a direction in which the hand (or a user's middle finger) is oriented, which is acquired from the pickup image. The ray control part 102 then designates, as the position of the end point of the ray, a position apart in the direction of the ray from the start point of the ray by the length of the ray. In this case, the length of the ray can be instructed through a predetermined user's operation (gesture). This predetermined user's operation is not particularly limited; other examples thereof include a user's sliding operation of sliding his/her fingertip over the OTP 110. In this case, as the sliding operation is repeated a larger number of times, the length of the ray increases. Alternatively, the length of the ray may be constant. The direction of the ray may be the direction in which the fingertip performs the sliding operation on the OTP 110. In this case, the ray control part 102 sets the direction in which the fingertip has performed the sliding operation on the OTP 110 to the direction of the ray, based on the positional information that has been retained in the RAM 802 in step S603. In addition, the final position of the end point of the ray may be determined by adding the movable direction and movement amount (movable direction instruction information) that have been determined based on the positional information on the hand to the position of the end point of the ray which has been determined based on the positional information on the hand. It should be noted that the start position (start point) and end position (end point) of the ray in FIG. 4B are updated whenever these points are determined.

In step S606, the control part 107 controls the CG control part 104 in such a way that the CG control part 104 determines whether the virtual object formed with CG which has been selected by the user is being moved in the first moving operation. As a result of the determination in step S606, when it is determined that the virtual object is being moved, the process proceeds to step S608. As a result of the determination in step S606, when it is determined that the virtual object is not being moved, the process proceeds to step S607. Herein, the "state where the virtual object is being moved" refers to a state where the virtual object has been selected by the user and the selection of the virtual object has not yet been released.

In step S607, the control part 107 controls the CG control part 104 in such a way that the CG control part 104 controls the virtual object in accordance with the gesture of the user's hand. The process then proceeds to step S614. More specifically, the CG control part 104 monitors the movement (gesture) of the user's hand, based on the pickup image and controls the virtual object in accordance with the movement of the hand. For example, when, during the monitoring of the pickup image, determining that the user has performed a gesture of slightly tapping in the air with his/her index finger so as to select a virtual object, the CG control part 104 selects the virtual object located at the end position of the ray. It should be noted that the pickup image used in step S607 may be a single still image or may be a plurality of still images that has been continuously acquired over a period from a predetermined past time to the current time.

In step S608, the control part 107 controls the CG control part 104 in such a way that the CG control part 104 determines whether the first moving operation has been transitioned to the second moving operation, namely, whether the first moving operation has been switched to the second moving operation. This determination is made, for example, based on whether the end point of the ray has been stopped over a predetermined time after the movement of the virtual object in the first moving operation. Thus, when the end point of the ray has been stopped over the predetermined time, the control part 107 determines that the first moving operation has been transitioned to the second moving operation. It should be noted that the predetermined time used for this determination is preferably settable and variable as appropriate. Alternatively, the determination in step S608 may be made based on whether the end position of the ray has been displaced after the movement of the virtual object in the first moving operation. Thus, when the displacement of the end position of the ray has stayed within a predetermined range during the predetermined time, the control part 107 determines that the first moving operation has been transitioned to the second moving operation. It should be noted that both the predetermined time and the predetermined range used for this determination are also preferably settable and variable as appropriate. In addition, the determination in step S608 may be made based on whether the touch operation has been performed on the OTP 110 of the compact operation device 160. Thus, when the touch operation has been performed thereon, the control part 107 determines that the first moving operation has been transitioned to the second moving operation. In addition, information indicating the transition to the second moving operation is retained in the RAM 802 and maintained therein until the second moving operation has been returned to the first moving operation. As a result of the determination in step S608, when it is determined that the first moving operation has been transitioned to the second moving operation, the process proceeds to step S609. As a result of the determination in step S608, when it is determined that the first moving operation has not been transitioned to the second moving operation, the process proceeds to step S612.

In step S609, the control part 107 controls the communication part 108 in such a way that the communication part 108 acquires the orientation information on the compact operation device 160 from the orientation detection part 111 of the compact operation device 160. The process then proceeds to step S610.

In step S610, the control part 107 controls the CG control part 104 in such a way that the CG control part 104 restricts directions in which the virtual object is movable in the second moving operation, based on the orientation information on the compact operation device 160 which has been acquired in step S609, thereby determining the movable directions (direction restricting step). In the present embodiment, as described above, the CG control part 104 functions as a direction restricting unit that restricts directions in which the virtual object is movable in the second moving operation. The directions determined in step S610 are two directions intersecting each other, namely, two-dimensional movable directions. As shown in FIG. 2C, for example, in a state where the compact operation device 160 is oriented in the direction of the arrow 202, namely, in the horizontal direction, the two-dimensional movable directions are determined to be an x-axial direction (horizontal direction) and a z-axial direction (depth direction) in an MR space 2000. As shown in FIG. 2D, in a state where the compact operation device 160 is oriented in the direction of the arrow 203, namely, in the vertical direction, the two-dimensional movable directions are determined to be the x-axial direction (horizontal direction) and a y-axial direction (vertical direction) in the MR space 2000. The combination of the x-axial direction, the y-axial direction, and the z-axial direction is not limited to these and depends on the orientation (attitude) of the compact operation device 160.

In step S610, the control part 107 controls the CG control part 104 in such a way that the CG control part 104 determines a movement amount M in which the virtual object is movable in the second moving operation. The "movement amount M" refers to the maximum distance by which, in the second moving operation that permits the virtual object to move in a stepwise manner, a virtual object is movable in each step. The movement amount M is set to be shorter than a distance by which the virtual object continuously moves at one time in the first moving operation. It should be noted that the movement amount M may be maintained at a constant value or may depend on the size of the virtual object. If the movement amount M depends on the size of the virtual object, as the virtual object is becoming larger, the movement amount M is set to be greater. In other words, as the virtual object is becoming smaller, the movement amount M is set to be smaller. After the execution of step S610, the process proceeds to step S611.

In step S611, the control part 107 controls the CG control part 104 in such a way that the CG control part 104 determines whether the virtual object is to be moved in the second moving operation. This determination is made based on the movable direction instruction information that has been used in step S605. As a result of the determination in step S611, when it is determined that the virtual object is to be moved in the second moving operation, the process proceeds to step S613. As a result of the determination in step S611, when it is determined that the virtual object is not to be moved in the second moving operation, the process proceeds to step S614.

In step S612, the control part 107 controls the CG control part 104 in such a way that the CG control part 104 updates the end position in FIG. 4B. The process then proceeds to step S614. More specifically, the CG control part 104 updates the end position of the virtual object so that the end position of the ray which has been calculated in step S605 coincides with that at coordinates converted into the coordinate system of the MR space.

In step S613, the control part 107 controls the CG control part 104 in such a way that the CG control part 104 updates the position of FIG. 4A. The process then proceeds to step S614. More specifically, the CG control part 104 updates the position of the virtual object by adding a constant movement amount to the movement direction contained in the movable direction instruction information that has been used in step S605. For example, suppose a case where the virtual object is located at (x1, y1, z1). When the two-dimensional movable directions are set to the directions along the x-axis and the z-axis and the movable direction instruction information indicates a movement in a forward direction, the CG control part 104 adds the movement amount M in such a way that the virtual object is located at (x1, y1, z1+M).

In step S614, the control part 107 controls the drawing part 105 in such a way that the drawing part 105 draws a virtual object. The process then proceeds to step S615. In this case, the virtual object to be drawn can be located at the position that has been updated in step S612 or step S613.

In step S615, the control part 107 controls the CG control part 104 in such a way that the CG control part 104 determines whether to place the virtual object selected by the user. For example, when determining that the user has extended all the fingers to make a gesture so as to place the virtual object, the CG control part 104 determines that the virtual object is to be placed. As a result of the determination in step S615, when it is determined that the virtual object is to be placed, the process proceeds to step S617. As a result of the determination in step S615, when it is determined that the virtual object is not to be placed, the process proceeds to step S616.

In step S616, the control part 107 controls the drawing part 105 in such a way that the drawing part 105 draws the ray. The process then proceeds to step S618. In this case, the position of the ray to be drawn is acquired from the data list shown in FIG. 4B.

In step S617, the control part 107 clears information indicating that the virtual object has been selected, information on a state of the second moving operation, and the positions of the start point and end point of the ray. The process then proceeds to step S620.

In step S618, the control part 107 determines whether the moving operation is the second moving operation, based on the information indicating the transition to the second moving operation that has been retained in the RAM 802 in step S608. As a result of the determination in step S618, when it is determined that the moving operation is the second moving operation, the process proceeds to step S619. As a result of the determination in step S618, when it is determined that the moving operation is not the second moving operation, the process proceeds to step S620.

In step S619, the control part 107 controls the drawing part 105 in such a way that the drawing part 105 draws scales, which will be described later. The process then proceeds to step S620.

In step S620, the control part 107 displays the image containing both the virtual object and the ray on the display 103 as an image of the MR space. The process then proceeds to step S621.

In step S621, the control part 107 determines whether to terminate the execution of the program, based on the flowcharts shown in FIGS. 6A and 6B. For example, when receiving an instruction of terminating the execution of the program from the user, the control part 107 determines that the execution of the program is to be terminated. As a result of the determination in step S621, when it is determined that the execution of the program is to be terminated, the process is terminated. As a result of the determination in step S621, when it is determined that the execution of the program is not to be terminated, the process returns to step S601. The subsequent steps then will be performed in order.

Figure 7A:
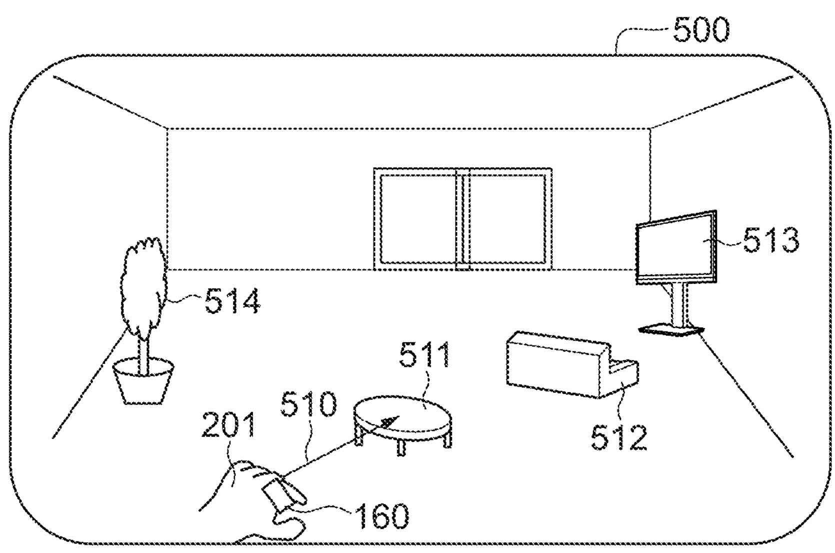
FIGS. 7A to 7G are views each showing an example of a state where a virtual object is moved in a MR space displayed on the HMD.

FIGS. 7A to 7G are views each showing an example of a state where a virtual object is moved in an MR space displayed on the HMD. FIG. 7A shows a state where the virtual object 511 is selected as a target to be moved, with the ray 510 extending from the user's hand 201. In FIG. 7A, the virtual object 511, the virtual object 512, and the virtual object 513 are arranged in line in this order with spacings therebetween. The state shown in FIG. 7A will be transitioned to a state shown in FIG. 7B.

Figure 7B:
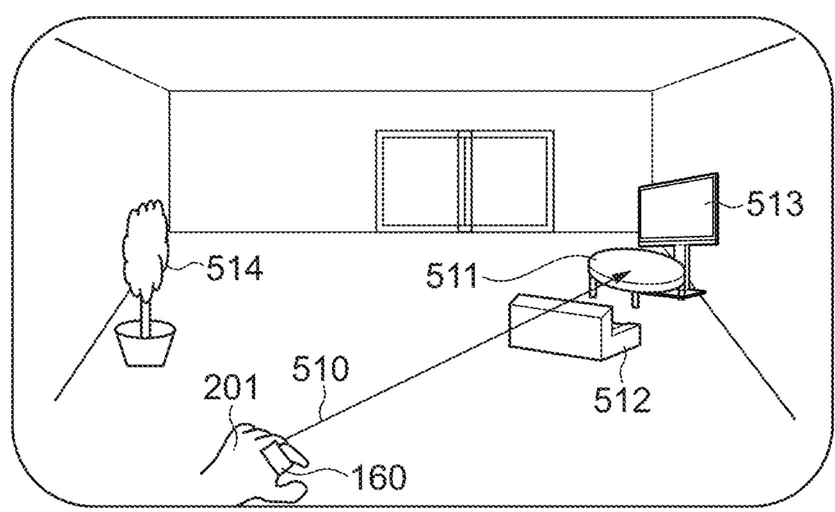

FIG. 7B shows a state where the user moves the hand 201 to move the virtual object 511 together with the ray 510 in the first moving operation so as to place the virtual object 511 in the space between the virtual object 512 and the virtual object 513. As described above, the first moving operation is used to move the virtual object 511 from the position in front of the virtual object 512 to the position between the virtual object 512 and the virtual object 513, namely, a departure point to a destination thereof. The state shown in FIG. 7B will be transitioned to a state shown in FIG. 7C.

Figure 7C:
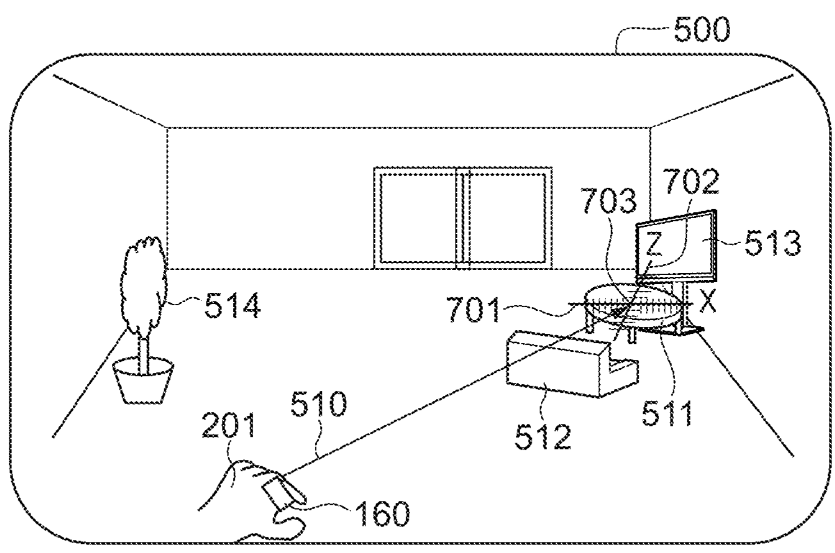

FIG. 7C shows a state where the first moving operation has been switched to the second moving operation and, by moving the hand 201, the virtual object 511 is just to be placed at any position between the virtual object 512 and the virtual object 513. As described above, the second moving operation is used to adjust the position of the virtual object 511 at the destination. In a second moving operation enable state where the second moving operation is enabled, an x-axis 701 (horizontal axis) and a z-axis 702 (depth axis) are displayed with the central point 703 of the virtual object 511, which is the target to be moved, defined as the origin. In this case, as described above, the compact operation device 160 is oriented in the direction of the arrow 202, namely, in the horizontal direction (see FIG. 2C). Both the x-axis 701 and the z-axis 702 are drawn as straight lines that indicate the movable directions of the virtual object 511 which are restricted in the second moving operation. In this case, for example, thick straight lines are preferably drawn as the x-axis 701 and the z-axis 702 for highlighting purposes. By displaying the x-axis 701 and the z-axis 702 in this manner, it is informed to the user in which directions the virtual object 511 is movable. In addition, for example, a thin or faint line may also be displayed as a y-axis 704 so that the y-axis 704 is less conspicuous than both the x-axis 701 and the z-axis 702. As a result, it is possible to distinguish between the directions in which the virtual object 511 is movable and other directions, in the second moving operation. In the second moving operation enable state, each of the x-axis 701 and the z-axis 702 has a scale that indicates the movement amount M (maximum distance). In the second moving operation, the user can move the virtual object 511 in one scale unit. The state shown in FIG. 7C will be transitioned to a state shown in FIG. 7D.

Figure 7D:
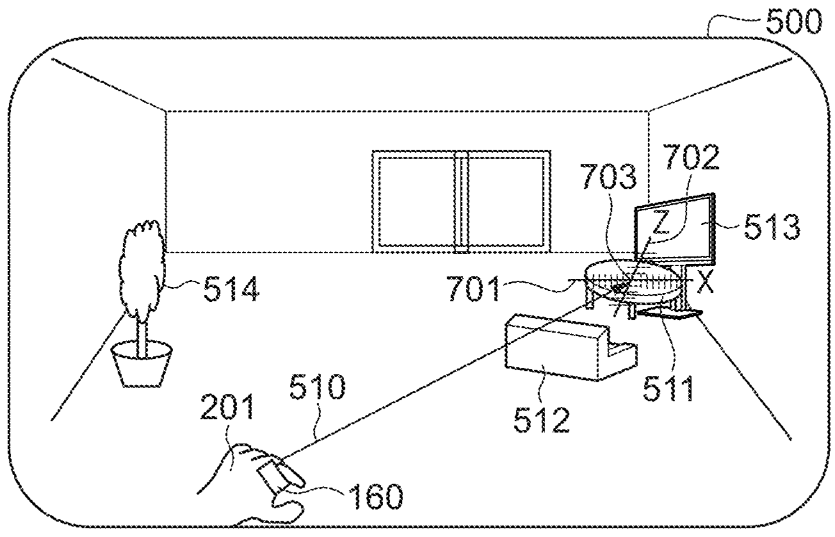

FIG. 7D shows a state where, by performing the sliding operation on the OTP 110 of the compact operation device 160 in a predetermined direction, the virtual object 511 has been moved by one scale along the z-axis 702 (in one direction), which is one of the x-axis 701 and the z-axis 702. In this state, the movement of the virtual object 511 along the x-axis 701 (in another direction) is restricted. For example, the second moving operation is controlled in such a way that the virtual object 511 is not permitted to move along the x-axis 701, namely, is prohibited from moving along the x-axis 701. As a result, even if the sliding operation performed on the OTP 110 of the compact operation device 160 is slightly deviated from the above direction, the virtual object 511 can be smoothly moved along the z-axis 702. The state shown in FIG. 7D will be transitioned to a state shown in FIG. 7E.

Figure 7E:
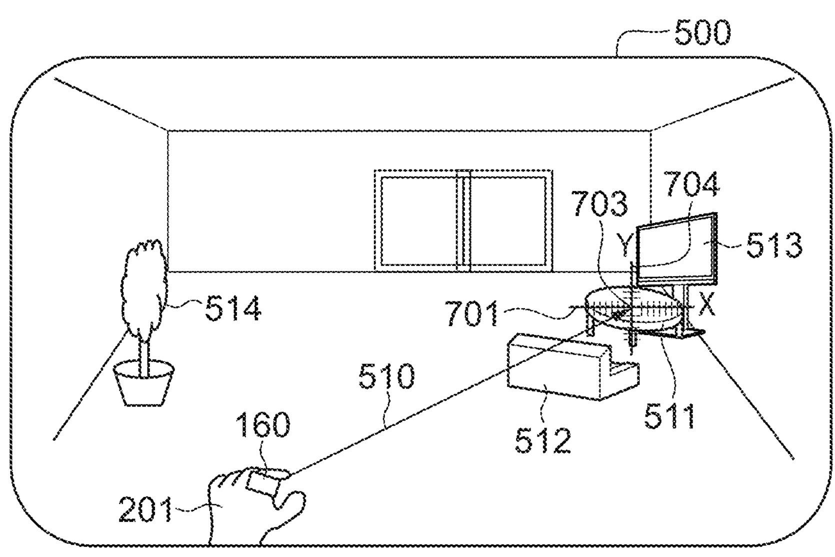

FIG. 7E shows a state where the second moving operation enable state has been maintained and, by moving the hand 201, the position of the virtual object 511 is just to be further adjusted. In this state, the x-axis 701 (horizontal axis) and the y-axis 704 (depth axis) are displayed with the central point 703 of the virtual object 511 defined as the origin. In this case, as described above, the compact operation device 160 is oriented in the direction of the arrow 203, namely, in the vertical direction (see FIG. 2D). Straight lines that indicate the movable directions of the virtual object 511 which are restricted in the second moving operation are drawn as the x-axis 701 and the y-axis 704. In this case, for example, thick straight lines are preferably drawn as the x-axis 701 and the y-axis 704 for highlighting purposes. By displaying the x-axis 701 and the y-axis 704 in this manner, it is informed to the user in which directions the virtual object 511 is movable. In the second moving operation enable state, each of the x-axis 701 and the y-axis 704 has a scale that indicates the movement amount M (maximum distance). In the second moving operation, the user can move the virtual object 511 in one scale unit. The state shown in FIG. 7E will be transitioned to a state shown in FIG. 7F.

Figure 7F:
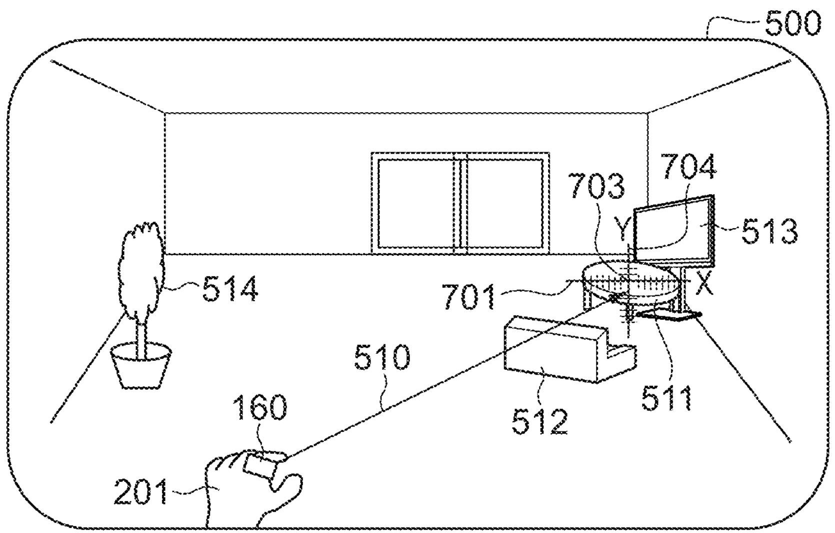

FIG. 7F shows a state where, by performing the sliding operation on the OTP 110 of the compact operation device 160 in a predetermined direction, the virtual object 511 has been moved by one scale along the y-axis 704, which is one of the x-axis 701 and the y-axis 704. In this state, the movement of the virtual object 511 along the x-axis 701 is restricted. The state shown in FIG. 7F will be transitioned to a state shown in FIG. 7G.

Figure 7G:
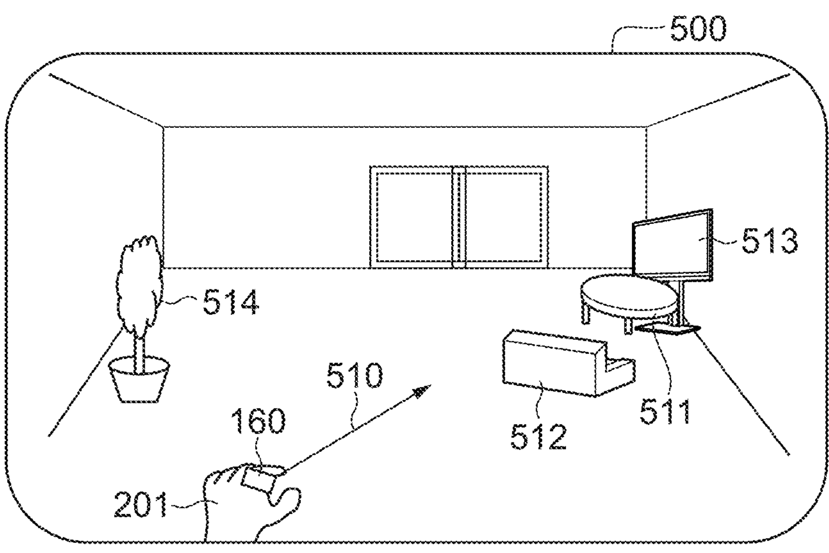

FIG. 7G shows a state where the x-axis 701 and the y-axis 704 have disappeared and the virtual object 511 has been completely placed. An instruction of terminating the placing of the virtual object 511 is provided, for example, in response to the user's sliding or tapping operation on the OTP with his/her finger. As described above, the OTP also functions as an operation unit that enables the user to perform an operation of determining that the virtual object 511 has been completely placed (moved). This function can prevent the virtual object 511 from unintentionally moving in the image 500.

By using the HMD 150 and the compact operation device 160, as described above, the virtual object 511 can be smoothly moved in the first moving operation from a departure point to a destination thereof in the image 500, which is an image of an MR space. Then, the position of the virtual object 511 at the destination can be accurately and easily adjusted in the second moving operation. It should be noted that, instead of the compact operation device 160, the user's hand 201 displayed in the image 500 may be used as the operation unit.

Operations performed on the virtual object 511 are not limited to moving operations on the virtual object 511 in the x-axis direction, the y-axis direction, and the z-axis direction; other examples of such operations may include operations of rotating the virtual object 511 around each axis, namely, rotating operations in a roll direction, a pitch direction, and a yaw direction. In such cases, for example, the virtual object 511 can be continuously rotated in the first moving operation from a position at which the virtual object 511 is placed, in response to a gesture and, in turn, can be rotated in a stepwise manner in a predetermined direction in the second moving operation. For example, one stepwise angle may be set to any angle, such as 10 degrees. In addition, the virtual object 511 may be continuously moved in the x-axis direction, the y-axis direction, and the z-axis direction in the first moving operation and, in turn, may be gradually rotated in a stepwise manner in a predetermined direction in the second moving operation. As described above, the functions of the shaft serving as the operation reference may be different from one another between the first moving operation and the second moving operation (the axial movement in the first moving operation and the rotation around the axis in the second moving operation).

Figure 8A:
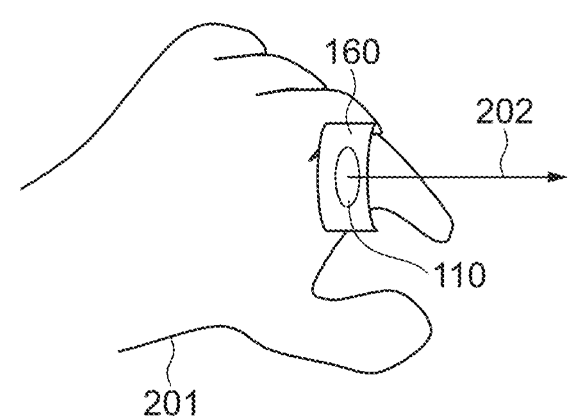
FIGS. 8A to 8C are views each showing a state where a compact operation device according to a second embodiment of the present invention is worn on a user's finger.
Figure 8B:
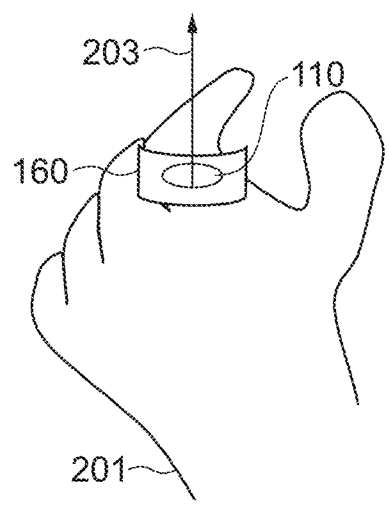
Figure 8C:
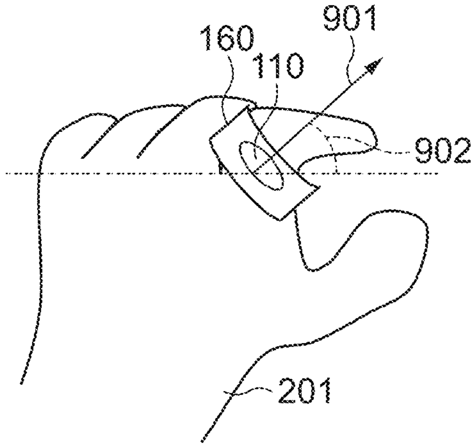

Hereinafter, a second embodiment of the present invention will be described with reference to FIGS. 8A to 8C and 9. Further, differences from the foregoing first embodiment will be mainly described, and the description of similar matters will be omitted. FIGS. 8A to 8C are views each showing a state where a compact operation device according to the second embodiment is worn on a user's finger. FIG. 8A is a view showing a state where a compact operation device 160 worn on the user's finger is oriented in the direction of an arrow 202, namely, in a horizontal direction, similar to the FIG. 2C. FIG. 8B is a view showing a state where the compact operation device 160 worn on the user's finger is oriented in the direction of an arrow 203, namely, in a vertical direction, similar to FIG. 2D. FIG. 8C is a view showing a state where the compact operation device 160 worn on the user's finger is oriented in the direction of an arrow 901, namely, in a diagonally upper right direction. An orientation detection part 111 of the compact operation device 160 can detect whether the compact operation device 160 is in any of the states of FIGS. 8A to 8C, for example.

Figures 9A, 9B:
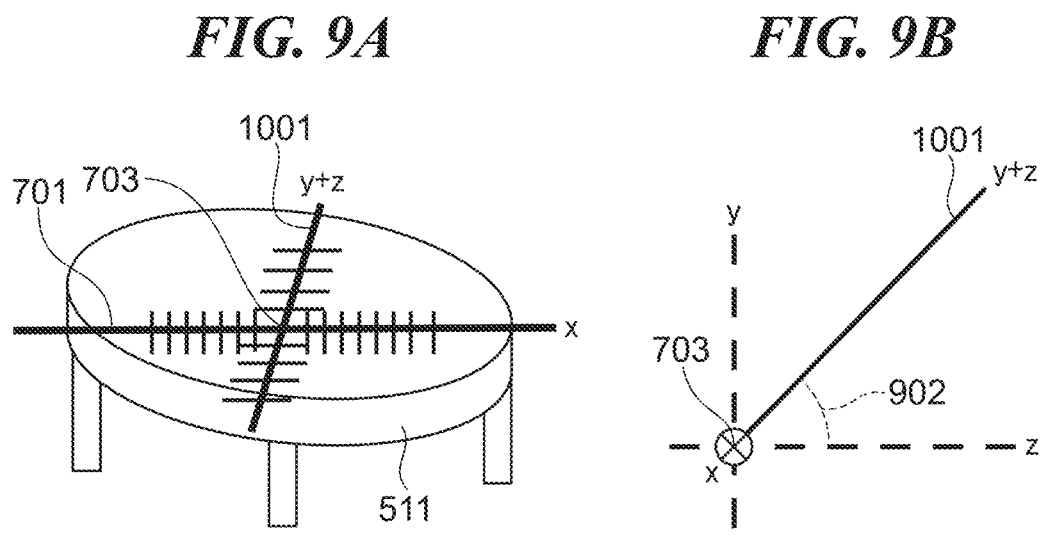

FIGS. 9A and 9B are diagrams each showing an example of an image displayed on a display of an HMD. FIG. 9A shows a state where, by moving a hand 201 in the second moving operation enable state, the position of a virtual object 511 is being adjusted. In this state, an x-axis 701 (horizontal axis) and a diagonal axis (diagonally upper right axis) 1001 are displayed with a central point 703 of the virtual object 511 defined as the origin. The diagonal axis 1001 is an axis that is disposed in the middle between a y-axis and a z-axis, namely, that extends in a direction inclined with respect to the y-axis (or x-axis). When both the x-axis 701 and the diagonal axis 1001 are displayed, the compact operation device 160 is oriented in the direction of the arrow 901, namely, in the diagonally upper right direction (see FIG. 8C). In this case, straight lines that indicate the movable directions of the virtual object 511 which are restricted in the second moving operation are drawn as the x-axis 701 and the diagonal axis 1001. In the second moving operation enable state, each of the x-axis 701 and the diagonal axis 1001 has a scale that indicates a movement amount M. In the second moving operation, a user can move the virtual object 511 in one scale unit. FIG. 9B shows the diagonal axis 1001 in FIG. 9A as viewed from an x-axial direction. An inclined angle 902 of the diagonal axis 1001 is the same as an angle between the direction of the arrow 901 and the horizontal direction. It should be noted that the inclined angle 902 may be variable, in which case the inclined angle 902 may be either continuously variable or a stepwise variable.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-021148, filed Feb. 15, 2024 which is hereby incorporated by reference wherein in its entirety.

What is claimed is:

1. A method for controlling an information processing apparatus, comprising:

an operation step of performing a moving operation of moving a virtual object in a virtual reality space or a mixed reality space, from a controller configured to be graspable by a hand of a user who uses the information processing apparatus;

a switching step of switching the moving operation in the operation step between a first moving operation that enables a continuous movement of the virtual object and a second moving operation that enables a stepwise movement of the virtual object;

a direction restricting step of restricting directions in which the virtual object is movable in the second moving operation to two directions out of three-dimensional directions in the virtual reality space or the mixed reality space, depending on an orientation or attitude of the controller;

in the second moving operation, display the two directions to which the direction restricting step restricts and respective scales indicating an amount of the stepwise movement of the virtual object, on a display; and in the second moving operation, move the virtual object in one of the two directions according to the moving operation.

2. An information processing system that performs a plurality of steps, the steps including:

an operation step of performing a moving operation of moving a virtual object in a virtual reality space or a mixed reality space, from a controller configured to be graspable by a hand of a user who uses the information processing system;

a switching step of switching the moving operation in the operation step between a first moving operation that enables a continuous movement of the virtual object and a second moving operation that enables a stepwise movement of the virtual object;

a direction restricting step of restricting directions in which the virtual object is movable in the second moving operation to two directions out of three-dimensional directions in the virtual reality space or the mixed reality space, depending on an orientation or attitude of the controller;

in the second moving operation, display the two directions to which the direction restricting step restricts and respective scales indicating an amount of the stepwise movement of the virtual object, on a display; and in the second moving operation, move the virtual object in one of the two directions according to the moving operation.

3. A non-transitory computer-readable storage medium that stores a program causing a computer to perform a method for controlling an information processing apparatus, the method for controlling the information processing apparatus comprising:

an operation step of performing a moving operation of moving a virtual object in a virtual reality space or a mixed reality space, from a controller configured to be graspable by a hand of a user who uses the information processing apparatus;

a switching step of switching the moving operation in the operation step between a first moving operation that enables a continuous movement of the virtual object and a second moving operation that enables a stepwise movement of the virtual object;

a direction restricting step of restricting directions in which the virtual object is movable in the second moving operation to two directions out of three-dimensional directions in the virtual reality space or the mixed reality space, depending on an orientation or attitude of the controller;

in the second moving operation, display the two directions to which the direction restricting step restricts and respective scales indicating an amount of the stepwise movement of the virtual object, on a display; and in the second moving operation, move the virtual object in one of the two directions according to the moving operation.

4. An information processing apparatus comprising:

a processor; and a memory storing a program which, when executed by the processor, causes the information processing apparatus to:

perform an acquiring process to acquire a moving operation of moving a virtual object in a virtual reality space or a mixed reality space, from a controller configured to be graspable by a hand of a user who uses the information processing apparatus;

perform a switching process of switching the moving operation between a first moving operation that enables a continuous movement of the virtual object and a second moving operation that enables a stepwise movement of the virtual object;

perform a direction restricting process of restricting directions in which the virtual object is movable in the second moving operation to two directions out of three-dimensional directions in the virtual reality space or the mixed reality space, depending on an orientation or attitude of the controller;

in the second moving operation, display the two directions to which the direction restricting process restricts and respective scales indicating an amount of the stepwise movement of the virtual object, on a display; and in the second moving operation, move the virtual object in one of the two directions according to the moving operation acquired by the acquiring process.

5. The information processing apparatus according to claim 4, wherein the first moving operation is used to move the virtual object from a departure point to a destination, and the second moving operation is used to adjust a position of the virtual object at the destination.

6. The information processing apparatus according to claim 1, wherein the program when executed by the processor further causes the information processing apparatus to:

perform an image acquiring process to acquire an image of a reality space; and perform a display control process to display the mixed reality space on a display, wherein the image of the reality space contains a hand of a user who uses the information processing apparatus, and in the acquiring process, the moving operation is acquired according to the hand of the user displayed in the mixed reality space.

7. The information processing apparatus according to claim 1, wherein the program when executed by the processor further causes the information processing apparatus to:

perform an image acquiring process to acquire an image of a reality space; and perform a display control process to display the mixed reality space on a display, wherein the information processing apparatus forms a head mounted display.

8. The information processing apparatus according to claim 4, wherein a maximum distance in which the virtual object is movable in each step in the second moving operation is shorter than a distance in which the virtual object is continuously movable at one time in the first moving operation.

9. The information processing apparatus according to claim 8, wherein the maximum distance depends on a size of the virtual object.

10. The information processing apparatus according to claim 8, wherein the program when executed by the processor further causes the information processing apparatus to perform a display control process to display the mixed reality space on the display, and wherein a scale indicating the maximum distance is displayed in the display control process.

11. The information processing apparatus according to claim 8, wherein the program when executed by the processor further causes the information processing apparatus to perform a display control process to display the mixed reality space on the display, and wherein a direction restricted in the direction restricting process is displayed as a straight line in the display control process.

12. The information processing apparatus according to claim 11, wherein the straight line is displayed in a highlighting manner in the display control process.

13. The information processing apparatus according to claim 4, wherein in the switching process, when the virtual object is stopped over a predetermined time after having been moved in the first moving operation, the moving operation is switched to the second moving operation.

14. The information processing apparatus according to claim 4, wherein in the switching process, when a displacement of the virtual object stays within a predetermined range during a predetermined time after the virtual object has been moved in the first moving operation, the moving operation is switched to the second moving operation.

15. The information processing apparatus according to claim 4, wherein in the acquiring process, a switching operation between the first moving operation and the second moving operation is further acquired.

16. The information processing apparatus according to claim 4, wherein in the direction restricting process, directions in which the virtual object is movable in the second moving operation are restricted to two directions intersecting each other, and one direction out of the two directions is made to be selectable, and in the acquiring process, an operation of moving the virtual object in the one direction is further acquired.

17. The information processing apparatus according to claim 16, wherein in the direction restricting process, the virtual object is restricted to moving in another direction out of the two directions.

18. The information processing apparatus according to claim 16, wherein a combination of the two directions is one of a combination of a vertical direction and a horizontal direction in the mixed reality space, a combination of the horizontal direction and a depth direction in the mixed reality space, and a combination of a selected direction out of the vertical direction and the horizontal direction and a diagonal direction inclined with respect to the selected direction in the mixed reality space.

19. The information processing apparatus according to claim 1, wherein the program when executed by the processor further causes the information processing apparatus to perform a display control process to display the mixed reality space on the display, and wherein a ray according to an orientation or attitude of the controller is displayed in the display control process.

20. The information processing apparatus according to claim 19, wherein the program when executed by the processor further causes the information processing apparatus to:

in the acquiring process, acquire an operation of placing the virtual object; and based on acquiring the operation of placing the virtual object in the acquiring process, clear information indicating selection of the virtual object and information on a start point and an end point of the ray.

* * * * *